(12) United States Patent
Schell et al.

(10) Patent No.: US 10,374,396 B2
(45) Date of Patent: Aug. 6, 2019

(54) ASSEMBLY FOR THE TOUCH-PROOF CONTACTING OF A BUS BAR SYSTEM

(71) Applicant: RITTAL GMBH & CO. KG, Herborn (DE)

(72) Inventors: Michael Schell, Dillenberg-Niederscheid (DE); Andreas Bastian, Dillenburg (DE); Ann-Sylvia Jungbauer, Lahnau (DE)

(73) Assignee: Rittal GmbH & Co. KG (DE)

( * ) Notice: Subject to any disclaimer, the term of this patent is extended or adjusted under 35 U.S.C. 154(b) by 0 days.

(21) Appl. No.: 16/088,492

(22) PCT Filed: Apr. 6, 2017

(86) PCT No.: PCT/DE2017/100275
§ 371 (c)(1),
(2) Date: Sep. 26, 2018

(87) PCT Pub. No.: WO2017/182033
PCT Pub. Date: Oct. 26, 2017

(65) Prior Publication Data
US 2019/0109440 A1    Apr. 11, 2019

(30) Foreign Application Priority Data

Apr. 22, 2016  (DE) .......................... 10 2016 107 565

(51) Int. Cl.
*H02B 1/06* (2006.01)
*H02B 1/056* (2006.01)
(Continued)

(52) U.S. Cl.
CPC .............. *H02B 1/06* (2013.01); *H02B 1/042* (2013.01); *H02B 1/0565* (2013.01); *H02B 1/20* (2013.01)

(58) Field of Classification Search
CPC .................................................. H02B 1/06
See application file for complete search history.

(56) References Cited

U.S. PATENT DOCUMENTS 3,419,177 A * 12/1968 Downs ..................... H02B 1/06
220/242
5,046,172 A    9/1991 Moreux et al.
(Continued)

FOREIGN PATENT DOCUMENTS

DE    202005013446 U1    11/2005
EP    0407241 A1    1/1991
(Continued)

OTHER PUBLICATIONS

International Search Report (in English and German) and Written Opinion (in German) issued in PCT/DE2017/100275, dated Aug. 9, 2017; ISA/EP.

*Primary Examiner* — Hung V Ngo
(74) *Attorney, Agent, or Firm* — Harness, Dickey & Pierce, PLC

(57) ABSTRACT

Apparatus for the touch-safe contacting of a busbar system having multiple busbars, wherein the arrangement has a touch protection housing made of electrically insulating material comprising receptacles for busbars, wherein the touch protection housing has a base having the receptacles and also a cover, which closes the receptacles and is optionally detachable from the base, having an installation side, wherein the arrangement furthermore has a multipole busbar adapter for the electrical contacting of the busbars, which is installed with an adapter housing on the installation side and for this purpose passes through the cover with at least one retaining foot engaging behind the busbars and also with at least one contact element in each case for every busbar to be electrically contacted.

12 Claims, 4 Drawing Sheets

(51) Int. Cl.
*H02B 1/04* (2006.01)
*H02B 1/20* (2006.01)

(56) References Cited

U.S. PATENT DOCUMENTS

| | | | | | |
|---|---|---|---|---|---|
| 5,067,043 | A | * | 11/1991 | Markowski | H02B 1/056 |
| | | | | | 361/611 |
| 5,072,071 | A | * | 12/1991 | Cassity | H02B 1/056 |
| | | | | | 174/135 |
| 5,272,591 | A | * | 12/1993 | Blue | H02B 1/06 |
| | | | | | 361/622 |
| 8,625,257 | B2 | | 1/2014 | Schalk et al. | |
| 9,515,397 | B2 | | 12/2016 | Buettner et al. | |
| 2012/0142202 | A1 | | 6/2012 | Schalk et al. | |
| 2014/0315401 | A1 | * | 10/2014 | Blasbalg | H01R 25/161 |
| | | | | | 439/110 |
| 2015/0111426 | A1 | | 4/2015 | Buettner et al. | |
| 2017/0237238 | A1 | | 8/2017 | Bastian | |

FOREIGN PATENT DOCUMENTS

| | | |
|---|---|---|
| EP | 0753916 A2 | 1/1997 |
| EP | 0859438 A2 | 8/1998 |
| EP | 2461440 A2 | 6/2012 |
| EP | 2538507 A1 | 12/2012 |
| EP | 2863496 A1 | 4/2015 |

\* cited by examiner

ASSEMBLY FOR THE TOUCH-PROOF CONTACTING OF A BUS BAR SYSTEM

CROSS-REFERENCE TO RELATED APPLICATIONS

This application is a 371 U.S. National Stage of International Application No. PCT/DE2017/100275, filed on Apr. 6, 2017, which claims priority to German Application No. 10 2016 107 565.5, filed on Apr. 22, 2016. The entire disclosures of the above applications are incorporated herein by reference.

BACKGROUND AND FIELD

The invention is directed to an arrangement for the touch-safe contacting of a busbar system comprising multiple busbars, wherein the arrangement has a touch protection housing made of electrically insulating material with a receptacle for busbars. Such an arrangement is known from EP 2 863 496 A1. EP 2 461 440 A2 describes a similar arrangement. The arrangements known from the prior art have the disadvantage that they are complex both to produce and also to handle.

SUMMARY

This section provides a general summary of the disclosure, and is not a comprehensive disclosure of its full scope or all of its features.

It is therefore the aspect of the invention to refine an arrangement of the type mentioned at the outset such that it is concurrently cost-effective to produce, can be installed easily on an existing busbar system, and additionally enables the simple contacting of the busbars of the busbar system.

Accordingly, an arrangement for the touch-safe contacting of a busbar system is proposed, in which the touch protection housing has a base, which has the receptacles, and also a cover, which closes the receptacles and is optionally detachable from the base, having an installation side, wherein the arrangement furthermore has a multipole busbar adapter for the electrical contacting of the busbars, which is installed with an adapter housing on the installation side and in addition passes through the cover with at least one retaining foot engaging behind the busbars and also with at least one contact element in each case for every busbar to be electrically contacted.

In comparison to the arrangements known from the prior art, it is possible using the multipole busbar adapter to achieve the contacting of all busbars in a single work step via the installation thereof on the installation side of the touch protection housing. For this purpose, for the contacting of a multipole busbar system, the busbar adapter can be placed at the installation side on the touch protection housing, and therefore the at least one retaining foot, but preferably multiple retaining feet of the busbar adapter can each engage behind one of the busbars and a contact element associated in each case with one of the busbars to be contacted contacts the respective busbar.

The adapter housing can have an adapter receptacle for installing an electronic component in the adapter housing. The adapter receptacle can be configured for this purpose to form a detachable or nondetachable friction-locked connection between itself and an electronic component to be contacted. This can be, for example, a screw connection or a catch connection. The adapter receptacle can furthermore be configured for electrical contacting between the electronic component and the at least one contact element. This can be provided by electrical contacts in the adapter receptacle.

If the touch protection housing is aligned with its installation side vertical, for example, if the busbars of the busbar system are arranged in a vertical plane one over another, it is thus possible that the busbar adapter is hooked or suspended via its retaining feet on the busbars extending in the horizontal direction.

The retaining feet can essentially have an L shape, with a plug section extending perpendicular to an installation side of the adapter housing, using which they pass through the installation side, and a section angled in relation thereto at the end of the respective retaining foot facing away from the busbar adapter, using which they engage behind the busbars.

The adapter housing does not necessarily have to rest on the installation side. To achieve good contacting between contact element and busbar, the at least one retaining foot and the at least one contact element can engage at opposing sides of a busbar, wherein the contact element and/or the retaining foot is configured for the purpose of being adjusted in the direction of the respective other of the two. The adjustment can be achieved by a spring pre-tension of one of the components or by a thread adjustment, as is known, for example, from EP 2 863 496 A1. However, this can have the result that a gap is formed between an installation side of the adapter housing and the installation side of the adapter housing opposite thereto, which spaces the installation sides apart from one another.

To ensure the reliable retention of the busbar adapter on the busbar system and the reliable contacting of the at least one busbar at the same time, at least the one retaining foot and the at least one contact element can engage at opposite sides of a busbar, wherein the contact element and/or the retaining foot is configured to be adjusted in the direction of the respective other of the two components.

To enable the most position-variable installation possible of the busbar adapter on the touch protection housing, the cover can have an installation side, which forms a planar installation plane extending over the entire base for multipole busbar adapters. The cover can be formed in one part or multiple parts. If it is formed in multiple parts, it can be prepared for juxtaposition, and therefore if multiple covers or partial covers are juxtaposed, an installation side having a planar support plane extending over the entire cover is again obtained.

The base of the touch protection housing can be formed in multiple parts. In particular, the base can have at least one lower part, to which the cover is detachably connected and in which the receptacles for busbars are formed as recesses which are open in the direction perpendicular to the installation side and continuous in the busbar longitudinal direction. The recesses are closed by the cover in the direction perpendicular to the installation side when the cover is connected to the at least one lower part. The cover can be connected to the lower parts via a hinge connection. The cover can be connected to the lower parts in a friction-locked, but detachable manner at a side of the cover opposite to the hinge connection. For this purpose, the cover can have a screw connection to the lower parts, for example.

The touch protection housing, or at least the cover, can be formed from an electrical insulator having a dielectric strength required for typical applications. The touch protection housing and/or its components, in particular the lower parts and the cover, can be injection-molded parts.

The base can have at least two lower parts, which are separate from one another and/or are connected to one another via at least one spacer web with a spacing, and which have recesses aligned in the busbar longitudinal direction for receiving each busbar. The spacer webs can be detachably connected to the lower parts, for example, via a detachable connector, such as a dovetail connection. The spacer webs can be dimensioned such that the lower parts are arranged at a spacing, at which corresponding fastening means for fastening the cover on the lower parts coincide, in particular align, for example, corresponding passages and threaded receptacles for the screw connection of the cover on the lower parts. The lower parts can be connected to one another using the spacer webs via the opposing long sides thereof. The opposing long sides can in this case each have a detachable connector, in particular a plug connector, for example, a dovetail connector, via which each spacer web is fixed at the opposite long sides.

Bar thickness compensation elements can be inserted into the recesses via the side of the recesses open in the direction perpendicular to the installation side. In this manner, it is possible to adapt the touch protection housing if needed for use with different busbar cross-sectional geometries. The bar thickness compensation elements can be fixed in the respective receptacle in the busbar longitudinal direction via a tongue-and-groove connection extending in the direction perpendicular to the installation side.

To simplify the positioning of the cover in relation to the base, it can be provided that the lower parts or the bar thickness compensation elements thereof have at least one projection, which is received in a formfitting manner in one of a plurality of passage slots in the cover, via which the contact feet can optionally pass through the cover, and therefore the cover assumes a predefined position in relation to the lower parts when it is placed on the lower parts.

The cover can have a planar cover plate, having a number of rows of regularly spaced-apart passage slots for the contact feet corresponding to the number of busbars to be contacted. For this purpose, the cover can have a plurality of perforated sections for the passage of the retaining foot and of the contact element and also a plurality of solid sections, wherein a solid section is formed between each two adjacent perforated sections and the perforated sections have a plurality of passage slots spaced apart from one another by parallel partition webs. The partition webs can each lead into one of the solid sections at the opposing ends thereof.

The solid and the perforated sections can each extend over the entire dimensions of the cover in the longitudinal direction of the busbars, and therefore multiple covers can be juxtaposed in the longitudinal direction while maintaining an uninterrupted grid with fixed grid spacing of the partition webs.

Furthermore, the lower parts and/or the bar thickness compensation elements can have plug slots, which align with the passage slots in the cover and extend in the direction perpendicular to the installation side, and via which the busbar adapter can engage behind the busbar with its retaining feet when the busbar adapter is placed on the installation side in the region of one of the lower parts. The plug slots can be formed from a plurality of parallel partition walls spaced apart from one another.

The retaining feet can be formed as blades with which they pass through the passage slots in the cover. These can be substantially narrower in the longitudinal direction of the busbars to be contacted than in a direction perpendicular thereto and to the installation plane. In this way, the passage slots in the cover can accordingly be kept narrow and the grid dimension of the passage slots can also be kept small.

A particularly high level of variability for the installation of the busbar adapter on the installation side is thus achieved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Further details of the invention will be explained on the basis of the following figures. In the figures.

DETAILED DESCRIPTION

Example embodiments will now be described more fully with reference to the accompanying drawings.

Figure 1:
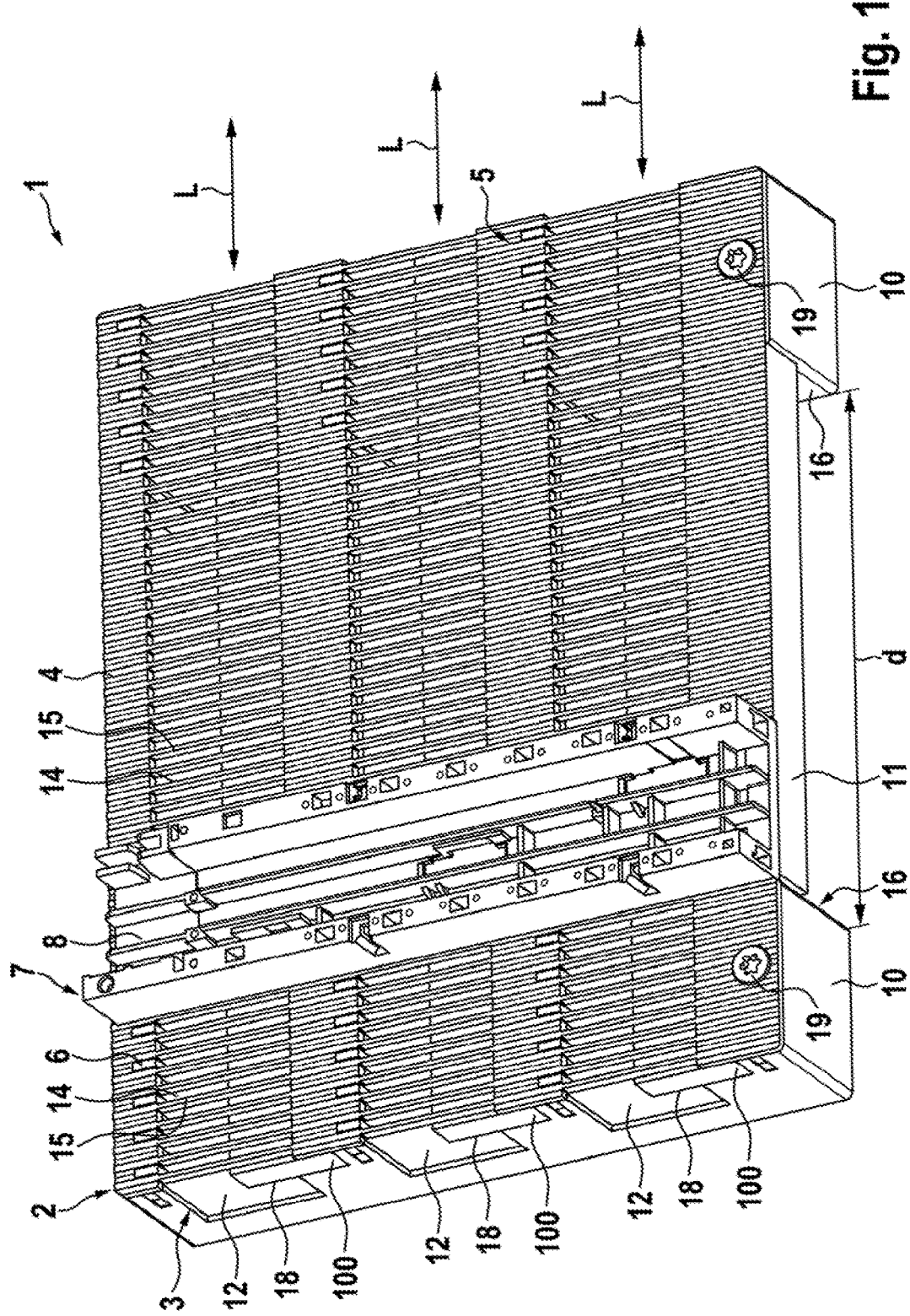
FIG. 1 shows a perspective view of one embodiment of the arrangement according to the invention looking toward the installation side of the touch protection housing.

The arrangement 1 shown in FIG. 1 for the touch-safe contacting of a busbar system substantially consists of a touch protection housing 2 having a three-pole busbar adapter 7 placed thereon. Furthermore, three busbars 100 received in the touch protection housing 2 are shown for illustration. The busbars 100 extend parallel and at a distance to one another in the longitudinal direction L thereof through the touch protection housing 2.

The touch protection housing 2 is substantially composed of two lower parts 10, which are connected to one another via spacer webs 11 at a spacing d, and which form the base with the webs 11, and a cover 4 integrally connecting these parts to one another. These components are formed as injection-molded parts from an electrical insulator material of suitable dielectric strength. The cover 4 is detachably fixed on the lower parts 10. For this purpose, it is suspended by a hinge at an upper longitudinal edge in the illustration of the cover 4 parallel to the longitudinal direction L on the lower parts 10 and has a screw connection to the lower parts 10 using threaded screws 19 on the opposite, lower longitudinal edge in the illustration. The lower parts 10 are connected to one another at the opposing longitudinal sides thereof via the spacer web 11 at the spacing d.

The cover 4 forms a planar installation side 5, via which the adapter housing 8 can be placed variably in the longitudinal direction L on the touch protection. The partition webs 15, which separate passage slots 14 adjoining one another in the longitudinal direction L from one another, can be formed thin, since they do not absorb loads. A fine grid and thus a highly-variable arrangement of the busbar adapter 7 on the installation side 5 is thus achieved. A row of parallel passage slots 14 extending in the longitudinal direction L is provided for the contacting of each busbar 100. The clear opening of the passage slots 14 overlaps only partially with the respective associated busbar 100. The busbar adapter 7 can thus firstly be placed via its L-shaped retaining feet 9

Figure 2:
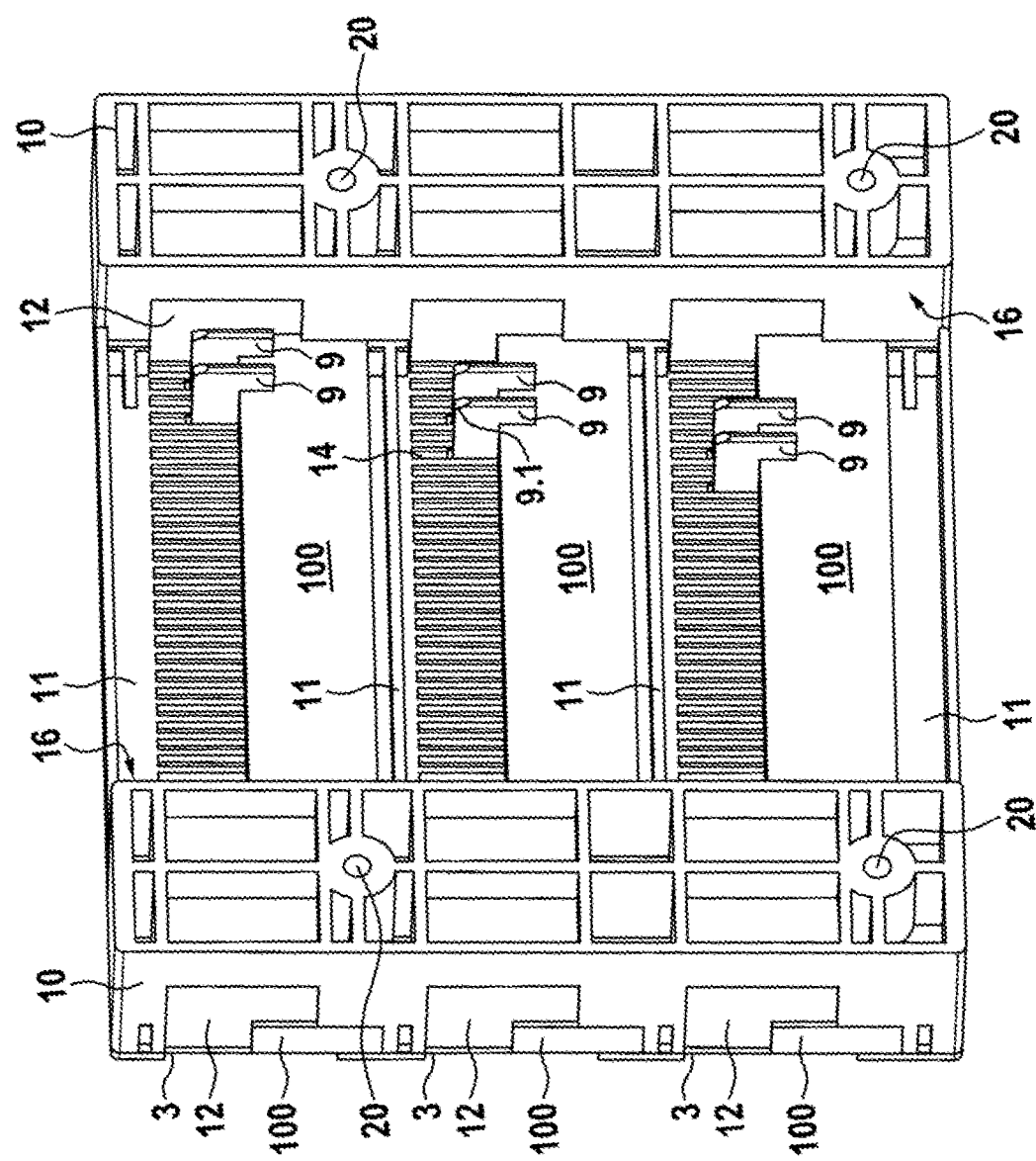
FIG. 2 shows a rear view of the embodiment according to FIG. 1.

(see FIG. 2) along the upper stop of the passage slots 14 on the cover 4, wherein it plunges with the retaining feet 9 through the cover 4, in order, in a following, vertical sliding movement of the busbar adapter 7 perpendicular to the longitudinal direction L and parallel to the installation side 5, to arrange the free ends 9.1 of the retaining feet 9 (see FIG. 2) of the busbar adapter 7 in relation to the respective busbar 100 such that the free end 9.1 of the respective contact foot 9 engages behind the busbar 100. FIG. 2 shows that the clear opening of the passage slots 14, which is not covered by the busbars 100, substantially just corresponds to the dimensions of the free ends 9.1 of the retaining feet 9 in the longitudinal direction of the adapter housing 8 of the busbar adapter 7.

It can also be seen from FIGS. 1 and 2 that bar thickness compensation elements 12 are inserted into the receptacles 3, the lower receptacle 18 of which is dimensioned in just such a way that the respective busbar 100 is received in a substantially formfitting manner between the busbar compensation element 12 and the cover 4.

The illustration according to FIG. 2 furthermore shows that the lower parts 10 each have passage boreholes 20, via which the touch protection housing 2 can be fixed in the interior of a control cabinet, for example, on an installation plate. The rear view according to FIG. 2 illustrates that the two lower parts 10 formed as separate components are connected to one another via four spacer webs 11. The connection between the spacer webs 11 and the lower parts 10 can be formed as detachable or nondetachable. It is also conceivable to form the lower parts 10 and the spacer webs 11 integrally, for example, as an integral injection molded part. Finally, the two outer spacer webs 11 have a side wall aligned with the end faces of the lower parts 10, which laterally covers the busbars.

Figure 3:
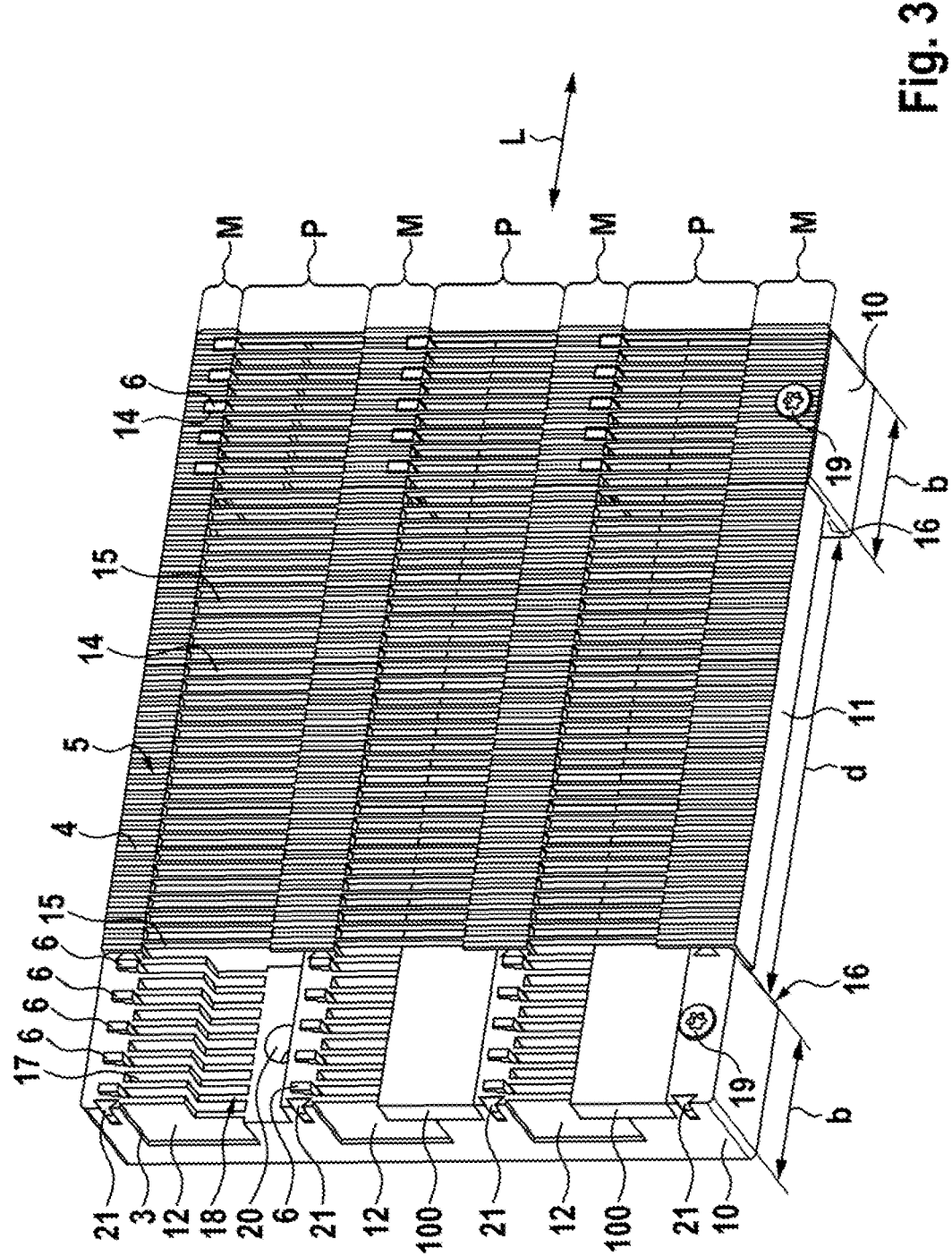
FIG. 3 shows a perspective view of the installation side of the touch protection housing of a further embodiment of the invention.

FIG. 3 shows an embodiment which is prepared for the juxtaposition. In particular, a further cover (not shown) corresponding to the cover 4 can be placed above the left lower part 10 in the illustration on the illustrated cover 4 while maintaining the grid of the passage slots 14, and therefore a continuous uniform installation plane 5 results for the installation of busbar adapters 7. For the precise alignment of the covers in relation to the lower parts 10, projections 6, which engage in corresponding recesses in the cover 4, are formed on the lower parts 10. The recesses in the cover 4 can be, for example, extensions of the passage slots 14, as is recognizable via the interaction of the projection 6 with the extended passage slot 14 in the region of the right lower part 10 in the illustration.

The cover 4 is a substantially planar component like a cover plate. The cover 4 is composed of alternating solid sections M and perforated sections P. Solid sections M are arranged in each case in the peripheral region. The perforated sections P consist of passage slots 14 separated from one another via parallel partition webs 15. The partition webs 15 each lead into a solid section M in the opposite ends thereof.

The lower parts 10 and/or the bar thickness compensation elements 12 thereof have plug slots 17, which are aligned with the passage slots 14 in the cover 4 and extend in the direction perpendicular to the installation side 5, and via which the busbar adapter 7 can engage behind the busbar 100 with its retaining feet 9 when the busbar adapter 7 is placed on the installation side 5 in the region of one of the lower parts 10. The plug slots 17 are separated from one another via parallel bulkhead walls.

FIG. 3 furthermore shows that the passage boreholes 20 (cf. FIG. 2) lead into the busbar receptacle 3 or the lower receptacle 18, respectively, and therefore the screw connection of the lower part 10 is concealed when a busbar 100 is inserted into the lower receptacle 18.

For the juxtaposition of multiple covers, it is provided that the cover 4 has a length in the longitudinal direction L of the busbars 100 which corresponds to the total of the width b of a lower part 10 and the spacing d of adjacent lower parts 10, therefore the length of the spacer webs 11 (without fastening means). For the juxtaposition, the lower parts 10 have plug connectors 21 in the form of a dovetail groove on the opposing longitudinal sides 16 thereof. The spacer webs 11 can each accordingly have a complementary contour, i.e., for example, a dovetail projection, on the opposing ends thereof as the fastening means, via which they can engage in the plug connectors 21.

Figure 4:
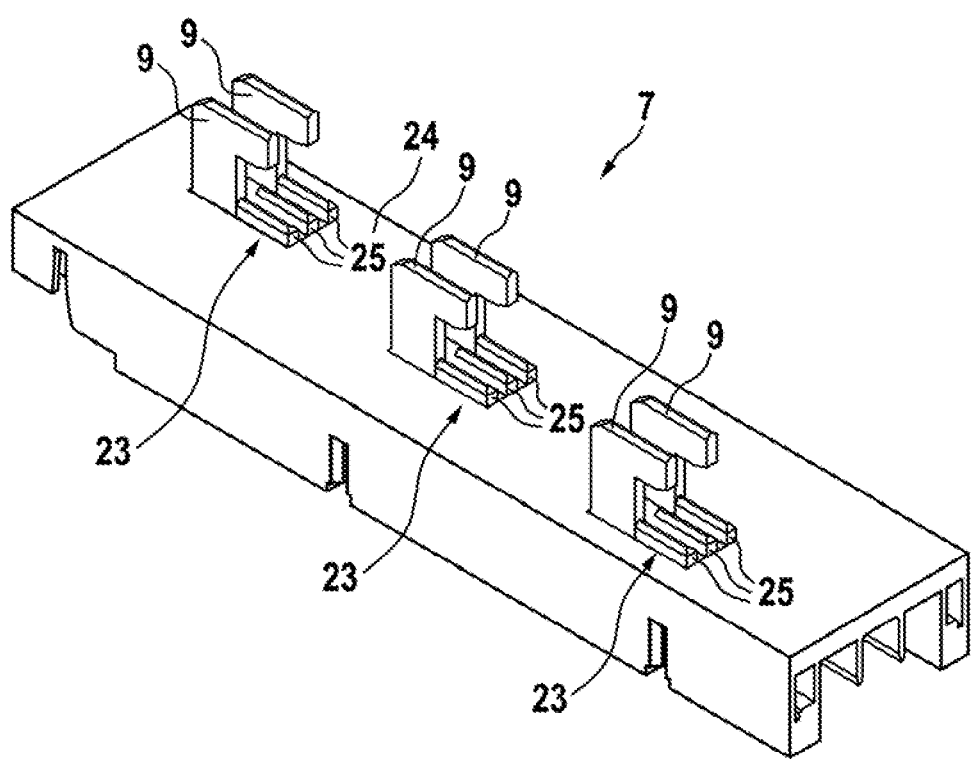
FIG. 4 shows a perspective view of the installation side of an exemplary busbar adapter.

FIG. 4 shows a view of the installation side 24 of the busbar adapter 7. The contact elements 23 of the adapter 7 for the electrical contacting thereof on the busbars of a busbar system may be seen therein. The contact elements 23 are formed as contact plates having protruding contact ribs 25, as is known from EP 2 863 496 A1. The contact plates pass with the contact ribs 25 through the passage slots 14 (cf. FIG. 1), in order to electrically contact the respective busbar assigned thereto. The contact elements 23 can be adjusted via a threaded drive or the like in the direction perpendicular to the installation side 5 of the cover 4 in relation to the installation side 24 of the busbar adapter 7, wherein the spacing between the contact element 23 and/or the free ends of the contact ribs 25 and the respective retaining foot 9 is also changed in order to fix the adapter 7 on the busbar arrangement, on the one hand, and to reliably contact the busbar arrangement, on the other hand.

The features of the invention disclosed in the above description, in the drawings, and in the claims can be essential for the implementation of the invention both individually and also in any arbitrary combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. Apparatus for the touch-safe contacting of a busbar system comprising multiple busbars, wherein the apparatus has a touch protection housing made of electrically insulating material comprising receptacles for busbars, which has a base having the receptacles and also a cover, which closes the receptacles and is optionally detachable from the base, having an installation side, wherein the apparatus furthermore has a multipole busbar adapter for the electrical contacting of the busbars, which is installed with an adapter housing on the installation side and for this purpose passes through the cover with at least one contact element in each case for every busbar to be electrically contacted, wherein the busbar adapter passes through the cover with retaining feet engaging behind the busbars, for which purpose the cover has a planar cover plate having a number of rows of regularly spaced-apart passage slots corresponding to the number of busbars to be contacted, wherein the retaining feet are formed as blades, with which they pass through the passage slots in the cover.

2. The apparatus as claimed in claim 1, wherein the retaining feet and the at least one contact element engage at opposite sides of a busbar, wherein the contact element and/or the retaining feet are configured to be adjusted in the direction of the respective other of the two.

3. The apparatus as claimed in claim 1, wherein the installation side forms an in particular integral and planar installation plane, extending over the entire base, for multipole busbar adapters.

4. The apparatus claimed in claim 1, wherein the base has at least one lower part, to which the cover is detachably connected and in which the receptacles for busbars are formed as recesses which are open in the direction perpendicular to the installation side and are continuous in the busbar longitudinal direction, wherein the recesses are closed by the cover in the direction perpendicular to the installation side when the cover is connected to the at least one lower part.

5. The apparatus as claimed in claim 4, wherein the base has at least two lower parts, which are separate from one another or are connected to one another via a spacer web at a spacing, and which have recesses aligned in the busbar longitudinal direction for receiving each busbar.

6. The apparatus as claimed in claim 5, wherein the lower parts are connected to one another via at least one spacer web at the spacing and via opposing longitudinal sides, wherein the opposing longitudinal sides each have a detachable connector, via which the spacer web is fixed in each case on the opposing longitudinal sides.

7. The apparatus as claimed in claim 4, wherein bar thickness compensation elements are inserted into the recesses via the side of the recesses open in the direction perpendicular to the installation side.

8. The apparatus as claimed in claim 7, wherein the bar thickness compensation elements are fixed in the respective receptacle in the busbar longitudinal direction via a tongue-and-groove connection extending in the direction perpendicular to the installation side.

9. The apparatus as claimed in claim 7, wherein the bar thickness compensation elements or the lower parts have at least one projection, which is received in a form fitting manner in one of a plurality of the passage slots in the cover, via which the contact feet can optionally pass through the cover, and therefore the cover assumes a predefined position in relation to the lower part when it is placed on the lower parts.

10. The apparatus as claimed in claim 7, wherein the bar thickness compensation elements have plug slots aligned with the passage slots in the cover and extending in the direction perpendicular to the installation side, via which the busbar adapter can engage behind the busbar with its contact feet when the busbar adapter is placed on the installation side in the region of one of the lower parts.

11. The apparatus as claimed in claim 1, wherein the cover has a plurality of perforated sections for the passage of the retaining foot and the contact element and a plurality of solid sections, wherein a solid section is formed between each two adjacent perforated sections and the perforated sections have a plurality of passage slots spaced apart from one another by parallel partition webs, and wherein the partition webs each lead into one of the solid sections at the opposing ends thereof.

12. The apparatus as claimed in claim 11, wherein the solid and perforated sections each extend over the entire extension of the cover in the longitudinal direction of the busbars, and therefore multiple covers can be juxtaposed in the longitudinal direction while maintaining a grid spacing of the partition webs.

\* \* \* \* \*